United States Patent [19]

Camps et al.

[11] Patent Number: 5,260,925
[45] Date of Patent: Nov. 9, 1993

[54] DISC-RECORD PLAYER HAVING AUTOMATIC LOADING AND UNLOADING FEATURES

[75] Inventors: Libert H. A. M. Camps; Petrus L. A. Rouws; Omar P. L. P. Van Heusden; Guido H. J. Switten, all of Hasselt, Belgium

[73] Assignee: U.S. Philips Corporation, New York, N.Y.

[21] Appl. No.: 699,846

[22] Filed: May 14, 1991

[30] Foreign Application Priority Data

May 14, 1990 [NL] Netherlands ............... 9001125
Sep. 28, 1990 [NL] Netherlands ............... 9002125

[51] Int. Cl.$^5$ .................... G11B 33/02; G11B 17/04
[52] U.S. Cl. ..................... 369/77.1; 369/75.2; 369/243; 369/263
[58] Field of Search ............. 369/77.1, 75.2, 77.2, 369/187, 263, 243

[56] References Cited

U.S. PATENT DOCUMENTS

| | | | |
|---|---|---|---|
| 4,507,768 | 3/1985 | Ikedo et al. | 369/77.1 |
| 4,592,039 | 5/1986 | Toyoguchi et al. | 369/77.1 |
| 4,628,498 | 12/1986 | Takamatsu et al. | 369/77.1 |
| 4,811,324 | 3/1989 | Ikedo et al. | 369/75.2 |
| 4,995,027 | 2/1991 | Aoyagi et al. | 369/77.1 |
| 5,097,460 | 3/1992 | Camps et al. | 369/292 |
| 5,132,958 | 7/1992 | Camps et al. | 369/77.1 |
| 5,212,683 | 5/1993 | Van Heusden | 369/291 |

*Primary Examiner*—Paul M. Dzierzynski
*Assistant Examiner*—Kim-Kwok Chu
*Attorney, Agent, or Firm*—David R. Treacy

[57] ABSTRACT

A disc player has a housing with a slot for the insertion of a disc-shaped information carrier. The disc player comprises an automatic loading system for loading and unloading an information carrier inserted in the slot. The loading system comprises an electrical drive unit and an actuating unit (10) for actuating a switching means (224) of an electrical circuit for energizing the electrical drive unit. The actuating unit comprises a first and a second tilting member (202; 206) with a first and a second follower element (204; 208) respectively adapted to cooperate with a main surface of the information carrier, and a pivotal element (210) for cooperation with the switching means, which pivotal element is controllable by the first and the second tilting member.

20 Claims, 6 Drawing Sheets

DISC-RECORD PLAYER HAVING AUTOMATIC LOADING AND UNLOADING FEATURES

CROSS-REFERENCE TO RELATED APPLICATIONS

This application is related to the inventions disclosed in co-pending applications Ser. No. 07/595,113 filed Oct. 9, 1990 (now U.S. Pat. No. 5,132,958), Ser. No. 07/630,683 filed Dec. 20, 1990 (now U.S. Pat. No. 5,097,460) and Ser. No. 07/755,255 filed Sep. 5, 1991 (now U.S. Pat. No. 5,212,683).

BACKGROUND OF THE INVENTION

The invention relates to a disc player comprising a housing with an opening for the insertion of a disc-shaped information carrier, a frame, a scanning device with a scanning unit, in particular an optical or magneto-optical scanning unit, a turntable which is rotatable about an axis of rotation, and an automatic loading system for moving the information carrier inserted in the opening to the turntable along a loading path and moving the information carrier from the turntable into the opening along an unloading path. The loading system comprises a drive element adapted to be driven by an electrical drive unit and to cooperate with the information carrier, and an actuating unit for actuating a switching means of an electrical circuit for energizing the electrical drive unit. The actuating unit comprises a tilting member with a follower element for cooperation with a main surface of the information carrier, which tilting member can be tilted between at least one operating position, in which the follower element engages with said main surface if the information carrier is present, and a starting position.

The invention also relates to an actuating unit for use in the disc player.

Such a disc player and actuating unit are known from British Patent Application GB 2,141,862 (herewith incorporated by reference). The known disc player comprises an optical scanning unit and a turntable and can be adapted to play audio and/or video discs. Such a disc can be inserted into the disc player via a slot in the front side of the housing, after which a loading mechanism transfers the disc to the turntable. The loading mechanism is also capable of returning the disc into the slot, for example after playing. For this purpose the loading mechanism comprises a drive shaft extending parallel to the slot and having rollers for cooperation with a first main surface of the disc and an actuating unit for the actuation of a switching unit for starting and stopping a drive motor for the drive shaft. The actuating unit comprises one pivotal element which is pivotable about an axis parallel to the drive shaft and which at one end carries following rollers situated opposite the drive shaft, for cooperation with a second main surface of the disc, and which at another end comprises a tongue for the actuation of said switching unit. The known disc player further comprises a detection unit with a switch for stopping the drive motor at an instant at which the inserted disc has reached a predetermined position in the housing. After the disc has been played or an eject button at the outside of the housing has been actuated the drive motor can be started to move out a disc situated inside the housing. The drive motor is stopped as soon as the follower element is no longer in contact with the second main surface of the disc, which then projects partly from the housing.

A drawback of the known disc player is that a disc which has been moved out by the loading system and which projects from the slot cannot be re-inserted automatically.

SUMMARY OF THE INVENTION

Therefore, it is an object of the invention to provide a disc player of the type defined in the opening paragraph, which enables both an information carrier inserted into the slot by hand or by means of a cassette and an information carrier moved into the slot by the loading system, for example after playing, to be transferred automatically to the turntable.

To this end the invention is characterized in that the actuating unit comprises a further tilting member with a further follower element for cooperation with the main surface of the information carrier, which further tilting member can be tilted between at least one operating position, in which the further follower element engages with the main surface if an information carrier is present, and a starting position, and further comprises a pivotal element for cooperation with the switching means, which pivotal element is controllable by the first-mentioned and the further tilting member, the pivotal element being in a first position and the electrical drive unit being in a non-energized condition in a first mode, in which both tilting members occupy the starting position; the pivotal element being in a second position in a second mode, in which the first-mentioned tilting member occupies the operating position and the second tilting member occupies the starting position; and the pivotal element being in a third position and the electrical drive unit being in an energized condition during operation in a third mode, in which both tilting members occupy the operating position. The electrical circuit comprises means for feeding an energizing current through the electrical drive unit after a change from the first to the second mode and for at least temporarily interrupting the energizing current to the drive unit, which is energized during operation, after a change from the third to the second mode.

In said first mode the disc player in accordance with the invention is ready to accept an information carrier. If in this condition an information carrier is inserted so far into the slot that the follower element contacts the main surface of the information carrier, the position of the pivotal element is changed by tilting of the first-mentioned tilting member, causing the switching means to be activated and the drive unit to be started. The loading system then moves the information carrier towards the turntable. The disc player is then in the second mode. During the movement of the information carrier towards the turntable the further follower element also comes into contact with main surface of the information carrier, the position of the pivotal element being changed again by tilting of the further tilting member. The disc player is then in the third mode. The drive unit is stopped at the end of the loading movement of the information carrier.

When the information carrier is moved away from the turntable, at an instant at which the information carrier projects partly from the housing, a change from the third to the second mode is effected, causing the drive unit to be stopped. In the second mode thus obtained the follower element of the first-mentioned tilting member is still in contact with the main surface of the information carrier. This has the advantage that, if desired, the information carrier can be returned into the housing automatically, i.e. without touching it by hand or otherwise.

Depending on the scanning device used the disc player in accordance with the invention is capable of scanning audio and/or video discs, such as CDs, CD-singles and LDs. It is also possible to scan data discs.

An embodiment of the disc player in accordance with the invention having a flat construction is characterized in that the pivotal element is pivotable in a plane which is oriented transversely of the axis of rotation of the turntable.

A practical embodiment is characterized in that the first-mentioned tilting member comprises a control projection for cooperation with a first stop portion of the pivotal element and the further tilting member comprises a further control projection for cooperation with a second stop portion of the pivotal element.

An accurately and reliably operating embodiment, in which the drive element comprises a drive roller for cooperation with a main surface of the information carrier, is characterized in that the pivotal element has a slot which extends at least substantially transversely of the drive roller and which is engaged by a fixed pin defining the first pivotal axis of the pivotal element, a resilient element secured to the frame biassing the pivotal element into the first position and exerting a return force to the first position on the pivotal element in the other positions. Preferably, the first-mentioned control projection in conjunction with the first stop portion then defines the second pivotal axis of the pivotal element. In such an embodiment the pivotal element performs accurately defined movements. In order to facilitate insertion of a disc the drive roller is preferably constructed as a circularly cylindrical member having a central portion of reduced diameter. In order to obtain a high friction coefficient the circumferential surface of the drive roller is preferably made of rubber.

An embodiment in which the information carrier which has been moved into the housing can be disengaged simply from the actuating unit of the loading system is characterized in that the actuating unit comprises a blocking element which, in conjunction with a command element of the disc player, keeps the further follower element clear of the main surface of the information carrier, if present. Depending on the location of the actuating unit in the housing and the dimensions of the information carrier to be scanned it may be necessary to block the first-mentioned follower element also in a manner as stated above. Moreover, it is found to be practical to arrange the blocking element on the further tilting member.

An embodiment which can be of compact construction and in which the tilting member can be tilted about a tilting axis oriented transversely of the loading and unloading path is characterized in that the further tilting member can be tilted about a further tilting axis parallel to the first-mentioned tilting axis.

An embodiment in which the switching means comprises a switch which is switchable to a first and a second position is characterized in that the switch is switchable by the pivotal element, the switch being in the first position in the first and the third mode and being in the second position in the second mode.

An embodiment in which the electrical drive unit is controlled in a sophisticated and effective manner is characterized in that said means comprise a microprocessor having an output electrically connected to the switching means.

An embodiment which comprises an eject switch and a detection unit for detecting a predetermined position of the inserted information carrier is characterized in that the microprocessor has outputs which are electrically connected to the eject switch and the detection unit.

A preferred embodiment of the disc player in accordance with the invention is characterized in that during operation and after a change from the third to the second mode the microprocessor keeps the energizing current interrupted for a specific time interval in the second mode and reverses the polarity of said current after expiry of said time interval. An advantage of this embodiment is that, if the ejected information carrier is not removed from the slot in the housing within the predetermined time interval, the information carried is automatically returned to the turntable. This is particularly important if the disc player is used in vehicles, in which the information carrier which projects from the housing is liable to be damaged or to fall out of the slot as a result of vibrations and the like.

The invention will now be described in more detail, by way of example, with reference to the drawings.

BRIEF DESCRIPTION OF THE DRAWING

FIG. 5 is a side view of a part of the actuating unit in a second mode while an information carrier is moved in.

DESCRIPTION OF THE PREFFERED EMBODIMENT

Figure 1:
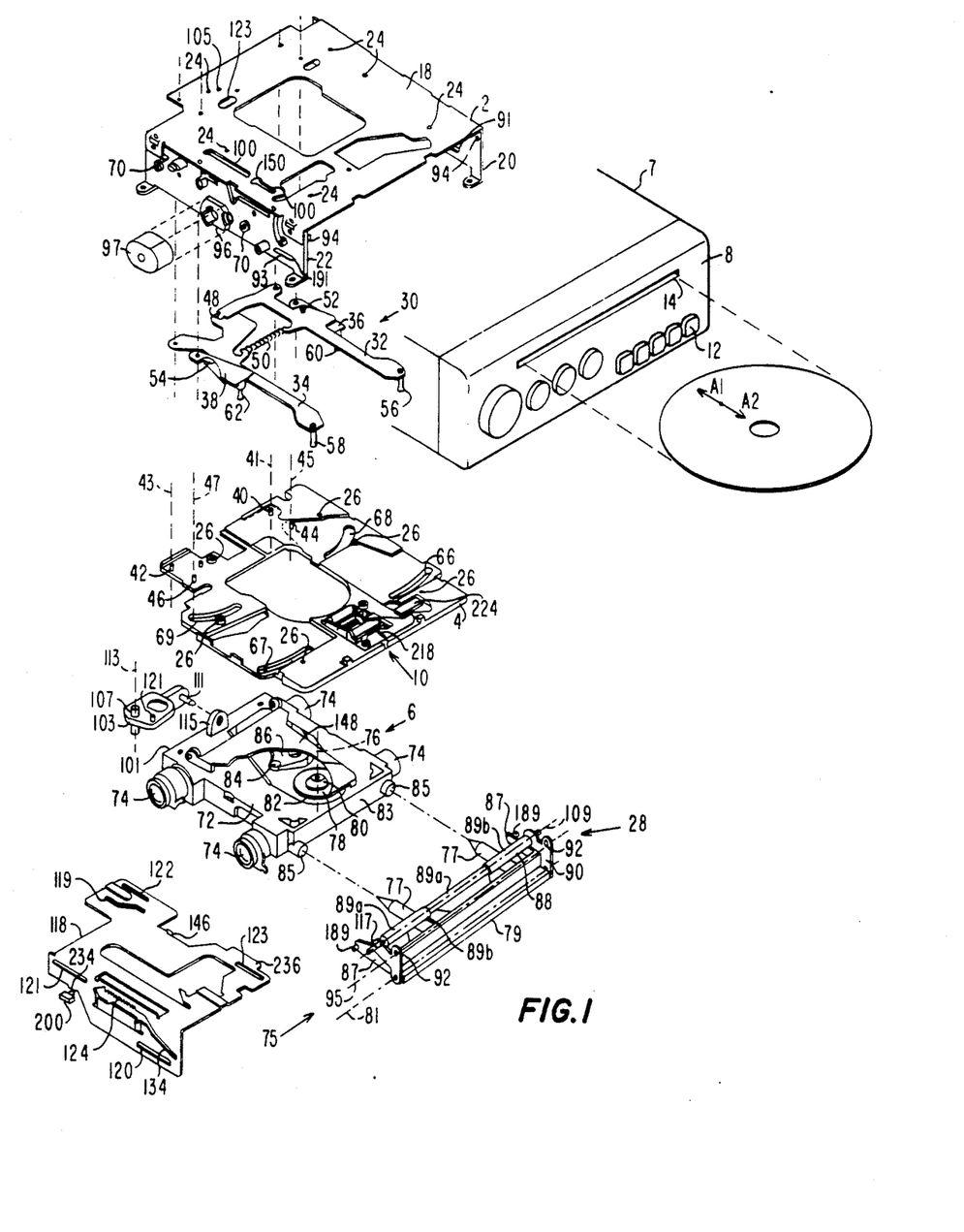
FIG. 1 is an exploded view of an embodiment of the disc player in accordance with the invention, comprising a loading system with an actuating unit in accordance with the invention.

The disc player in accordance with the invention shown in FIG. 1 is suitable for inscribing and/or reading optical disc-shaped information carriers, such as CDs and CD-singles. The disc player has a frame comprising a partly metal first frame section 2 and a plastics flat second frame section 4, and an optical scanning device 6 secured to the frame section 4. The frame 2, 4 is accommodated in a casing or housing 7 having a front wall 8. The front wall 8, which carries control knobs and buttons, such as an eject button 12, has a slot 14 for inserting and ejecting an optical information carrier or disc 16, in the present example a CD, into and out of the disc player in an inward direction A1 and an outward direction A2 respectively.

The frame section 2 has a main wall 18 and two side walls 20 and 22. The main wall 18 is provided with six holes 24, which correspond to six holes 26 in the frame section 4. Bolts, not shown, passed through the holes 24 and 26 secure the frame section 4 to the inner side of the main wall 18 of the frame section 2.

The disc player shown in FIG. 1 further comprises a loading device or loading system 28 with a centering device 30. The centering device 30 comprises a first pair of pivotal arms 32 and 34 and a second pair of pivotal arms 36 and 38. By means of pivots 40 and 42 the first pivotal arms 32 and 34 are supported on the frame section 4 so as to be pivotable about pivotal axes 41 and 43 respectively. By means of pivots 44 and 46 the second pivotal arms 36 and 38 are supported on the frame section 4 so as to be pivotable about pivotal axes 45 and 47 respectively. A tension spring 50 is arranged between the first pivotal arms 32 and 34, which are movably coupled by means of a pin-slot linkage 48. The second pivotal arms 36 and 38 are movably coupled to the first pivotal arms 32 and 24 by means of two pin-slot linkages 52 and 54. The first pivotal arms 32 and 34 comprise centering elements 56 and 58 and the second pivotal arms 36 and 38 comprise centering elements 60 and 62. The centering elements 56, 58, 60 and 62, which are intended for cooperation with a circumferential edge 64 of the optical disc 16, are constructed as rollers, the central axes of the centering elements 56, 58, 60 and 62 extending parallel to the pivotal axes 41, 43, 45 and 47. To allow the cooperation with the circumferential edge 64 the frame section 4 is provided with four slots 66, 67, 68 and 69, through which the centering elements 56, 58, 60 and 62 extend.

The optical scanning device 6, which is of a type known per se, for example as disclosed in U.S. Pat. No. 4,403,316 (PHN 10.134, herewith incorporated by reference), has a subframe 72, which is connected to the frame section 2 by means of four pins, which extend through holes 70 in the side walls 20 and 22 of the frame section 2, and four resilient and damping elements 74. The scanning device 6 comprises a turntable 78 which is rotatable about an axis of rotation 76 and which has a centering mandrel 80 and a supporting surface 82 for an optical disc. The axis of rotation 76 extends parallel to the mutually parallel pivotal axes 41, 43, 45 and 47. The scanning device 6 further has a scanning unit 84 which comprises an objective and which in the present example is secured to an electromagnetically drivable pivotal arm 86.

The loading system 28 comprises a drive roller 88 which is rotatably supported in a tilting member 90. The circularly cylindrical drive roller 88, which is rotatable about an axis 109, preferably has a central portion 89a of reduced diamter. The end portions 89b at both sides of the central portion 89a, as well as the central portion 89a, preferably have a rubber contact surface. The tilting member 90 has two holes 92, which correspond to two holes 94 in the side walls 20 and 22 of the frame section 2, the tilting member 90 being journalled by means of two journals which extend through the holes 92 and 94 and which define a tilting axis 95 for the tilting member 90. The drive roller 88 is driven, via a gear-wheel transmission, not shown, by an electrical drive unit or electric motor 97, in the present example a d.c. motor, which is secured to a mounting portion 96 of the side wall 22 of the frame section 2.

An optical disc inserted in the slot 14 in the wall 8 activates an actuating unit 10 and is moved between the centering elements 56, 58, 60 and 62 of the centering device 30 and above the scanning device 6 by the drive roller 88. During the inward movement of the optical disc 16 the central portion 89a of the roller 88 initially cooperates with a main surface 91 of the optical disc, and subsequently the end portions 89b. The optical disc is then situated between the roller 88 and the frame section 4 and successively comes into contact with the first centering elements 56 and 58 and the second centering elements 60 and 62. The inward movement is stopped once the desired position of the optical disc relative to the turntable is detected. For this purpose the frame carries a detection unit, for example a detection switch 200.

The disc player in accordance with the invention comprises a latching device 75 for latching the subframe 72 of the scanning device 6. In the present example the latching device 75 comprises two pin-shaped latching members 77, which are integral with a plastics latching element 79. The latching element 79 is movably connected to said tilting member 90, which forms part of the latching device 75, and is pivotable relative to the tilting member 90 about a pivotal axis 81. The tilting member 90 carrying the latching element 79 is situated between the front wall 8 and the front side 83 of the subframe 72, i.e. the side opposite slot 14 in the front wall. Opposite the latching members 77 the front side 83 has two openings 85 in which the latching members 77 are engageable to latch the subframe 72. In order to enable the latching members 77 to be moved in a well-defined manner towards and away from the openings 85 during tilting of the tilting member 90, the latching element 79 comprises at least one arm 87 with a pin 189, which pin engages a slot 191 formed in the wall 22 of the frame section 2 and having a guiding edge 93.

In most cases it will be desirable to latch the subframe 72 completely relative to the frame 2, 4 during loading and unloading of an optical disc. For this purpose, in the present example, a pivotable latching unit 103 is arranged near the rear 101 of the subframe 72, which unit is pivotable via a journal 107 engaging an opening 105 in the frame 2, 4 and comprises a latching pin 111. By pivoting the latching unit 103 about the axis 113 the latching pin 111 can be coupled to or disengaged from a coupling member 115 of the subframe 72.

The disc player shown in FIG. 1 comprises a command element 118 which is supported on the frame section 2 so as to be movable in the directions indicated by the arrows A1 and A2. For this purpose the command element 118 has four guide slots 120, 121, 122 and 123, which are engaged by guide pins on the main wall 18 and the side wall 22 of the frame section 2. The command element 118 is driven by the electric motor 97 via a gear-wheel transmission 124, which is shown partly.

The command element 118 has an inclined slot 134, which is engaged by a journal 117 of the tilting member 90, and it also has a slot 119, which is engaged by a journal 121 of the latching unit 102, which journal 121 extends through an opening 123 in the frame section 2. If the command element 118 is driven by the electric motor 97 after the optical disc 16 has been positioned correctly relative to the turntable 78 the centering elements 56, 58, 60 and 62 are moved to a suitable distance from the disc by tilting the tilting member via a coupling, not shown, to the command element during the movement of the command element 118 in the direction A1, and the latching members 77 are disengaged from the openings 85, also by tilting of the tilting member 90, and the latching pin 111 is disengaged from the coupling member 115 of the subframe 72 by tilting of the element 103. Moreover, the optical disc is then pressed against the supporting surface 82 of the turntable 78 by a disc-pressure member 148, for which purpose the command element comprises an actuating projection 146.

To remove an optical disc from the turntable 82 and eject it the command element 118 is moved in the direction indicated by the arrow A2 by means of the drive unit 97, for example upon depression of the eject button 12, the latching members 77 and the latching pin 111 being coupled to the subframe 72 by tilting of the tilting member 90 and pivoting of the latching unit 103 respectively as a result of the movement of the journal 117 in the slot 134 and the journal 121 in the slot 119. During the movement of the command element 118 in the direction A2 the spring 50 arranged between the first pivotal arms 32 and 34 ensures that the centering elements 56, 58, 60 and 62 are moved towards the circumferential edge of the disc. The spring 50 produces enough spring force to move the disc situated on the turntable so far along the axis of rotation 76 of the turntable 78 by means of the double-cone centering elements 56, 58, 60 and 62 that the disc can be moved outward over the centering cone 80 when the roller 88 is suitably driven.

The above-mentioned actuating unit 10, which is secured in an opening in the frame section 4, and the operation of this unit will be described in more detail with reference to FIGS. 2 to 11. The actuating unit 10 comprises a (first) tilting member 202 with a (first) follower element 204 in the form of a roller, a further (second) tilting member 206 with a further (second) follower element 208 and a pivotal element 210. The first tilting member 202 can be tilted about a tilting axis 212 parallel to the drive roller 88 and the second tilting member 206 can be tilted about a tilting axis 214 parallel to the drive roller 88. The tilting axes 212 and 214 may be defined by journals supported in the frame section 4. The follower elements 204 and 208, which each extend parallel to the drive roller 88, are journalled in the tilting members 202 and 206 respectively. The pivotal element 210 is pivotable in a plane oriented transversely of the axis of rotation 76 of the turntable 78 and has a slot which extends in the same direction as the arrows A1 and A2 and which is engaged by a pin 218 secured to the frame section 4. A helical spring 220 bearing against the frame acts on the pivotal element 210 at a location 215 shown in FIG. 2, the pivotal element 210 acting both against the pin 218 and against a projection 222 of the first tilting member in the situation illustrated in FIG. 2. The pivotal element further comprises a switching limb 210a for cooperation with a switch 224 arranged on the frame section 4 and forming part of an electrical circuit 225 for controlling the electrical drive unit 97.

Figure 2:
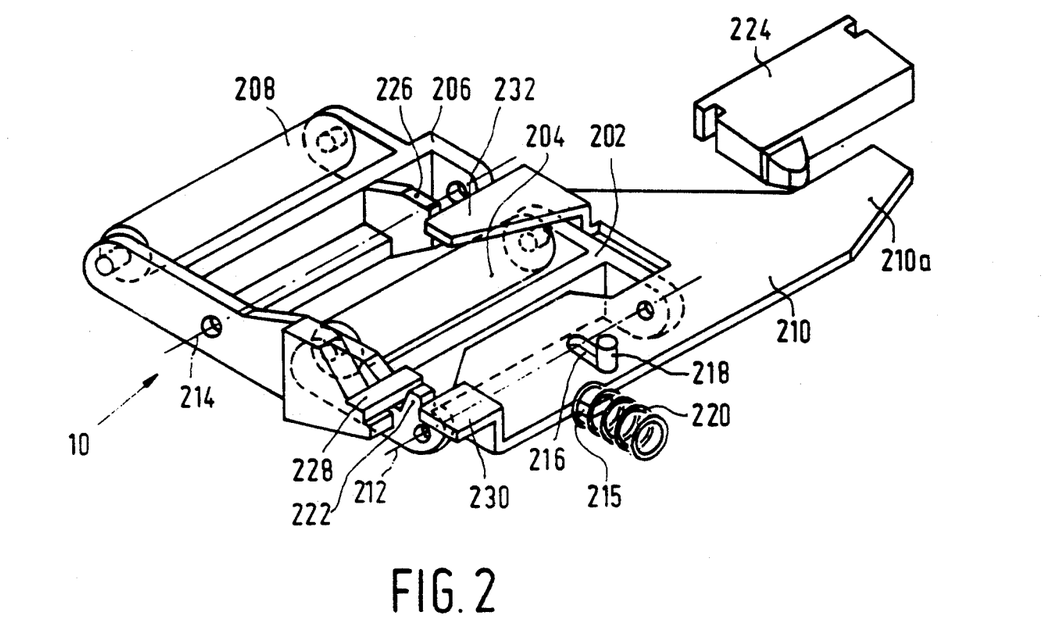
FIG. 2 is a perspective view of an embodiment of the actuating unit in accordance with the invention.

For the cooperation of the tilting members 202 and 206 with one another and with the pivotal element 210 the first tilting member comprises the said projection 222, hereinafter referred to as the first control projection, the second tilting member 206 comprises a second control projection 226 and a blocking element 228, and the pivotal element comprises a first follower limb 230 and a second follower limb 232.

Figure 3:
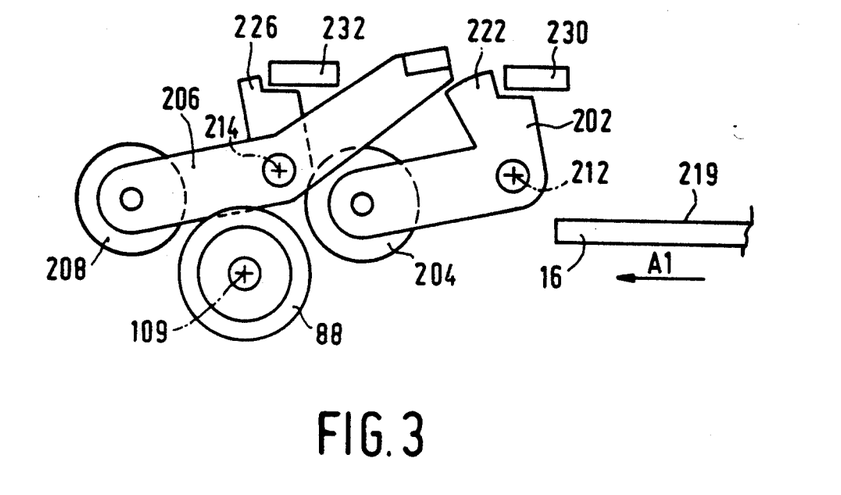
FIG. 3 is a side view of a part of the actuating unit in a first mode.
Figure 4:
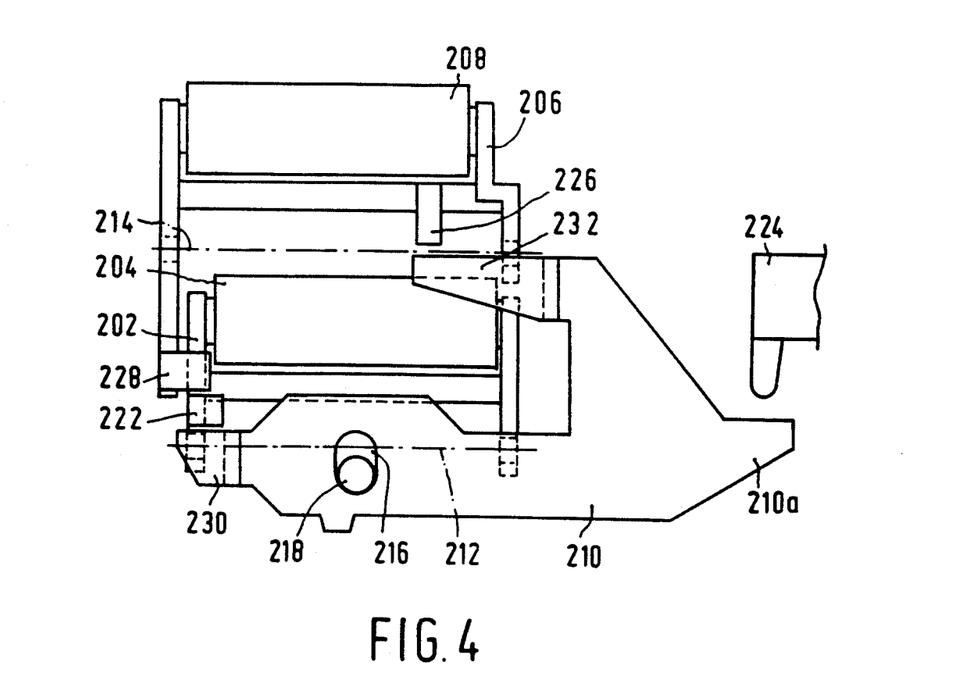
FIG. 4 is a plan view of the part shown in FIG. 3.

FIGS. 3 and 4 illustrates a first mode in which there is no disc in the disc player. The tilting members 202 and 206 are both in a rest or starting position and the pivotal element 210 is in a first position in which the drive unit 97 is not energized. The first switch 224, which in the present example can be switched to two positions, is in a first switch position. If in this situation a disc 16 is inserted into the slot 14 of the disc player in accordance with the invention in the direction A1, the disc will reach the follower roller 204 of the tilting member 202 at a given instant, thereby causing the tilting member 202 to be tilted clockwise about the tilting axis 212 until the follower roller 204 engages with the main surface 219 of the disc 16. Owing to the special construction of the drive roller 88 a disc inserted in the slot 14 approaches the drive roller, in particular its central portion 89a, at an angle which is favourable with respect to the force necessary to insert the disc between the drive roller 88 and the actuating unit 10. Moreover, the special construction of the driver roller 88 enables the follower roller 204 to be actuated before the disc engages with the end portions 89b, which also has a favourable effect on said force. During said tilting movement the pivotal element 210 is pivoted about the pin 218 by the control projection 222, the switching limb 210a of the pivotal element 210, which has been moved to its second position, setting the switch to its second switch position, after which under operating conditions the drive unit 97 is energized and the drive roller 88 is driven. The disc 16, which has been inserted deeper between the drive roller 88 and the follower roller 204, which is in its operating position, is now automatically moved inward in a manner as described hereinbefore.

Figure 5:
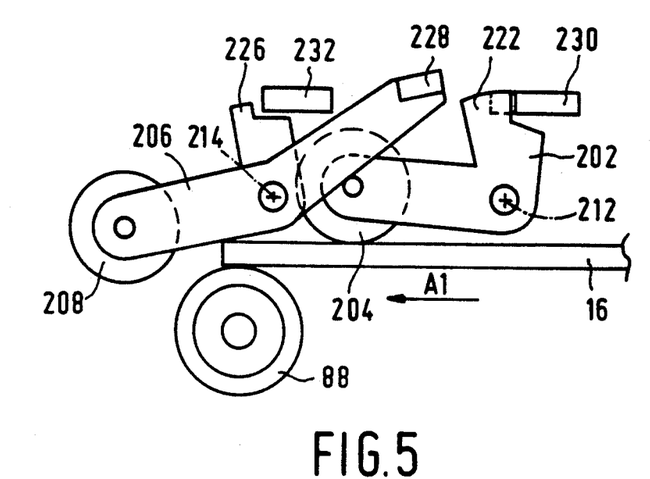
Figure 6:
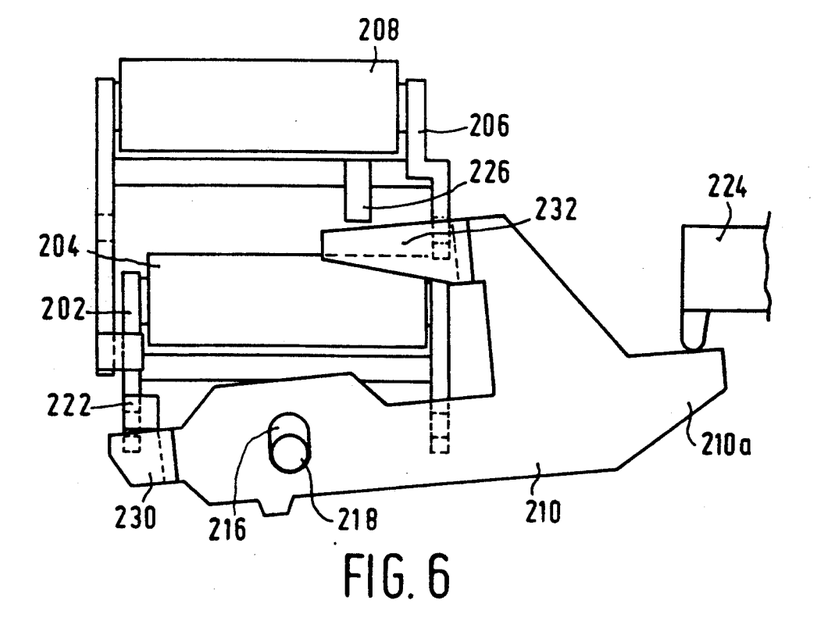
FIG. 6 is a plan view of the part shown in FIG. 5.
Figure 7:
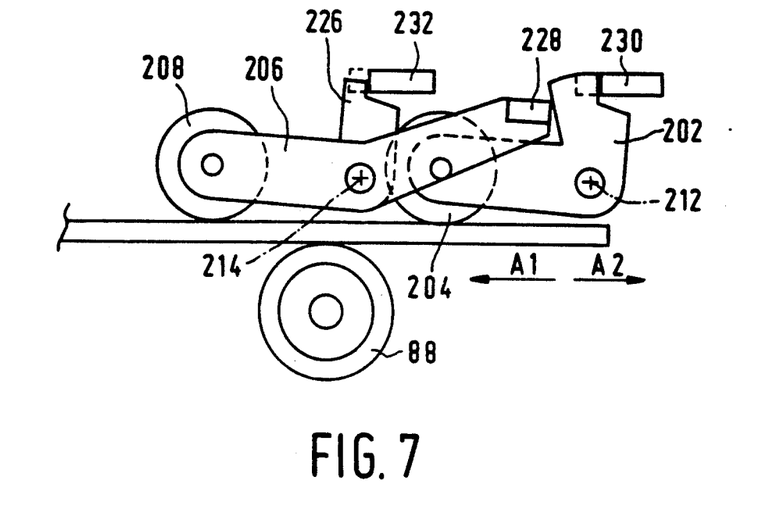
FIG. 7 is a side view of a part of the actuating unit in a third mode.
Figure 8:
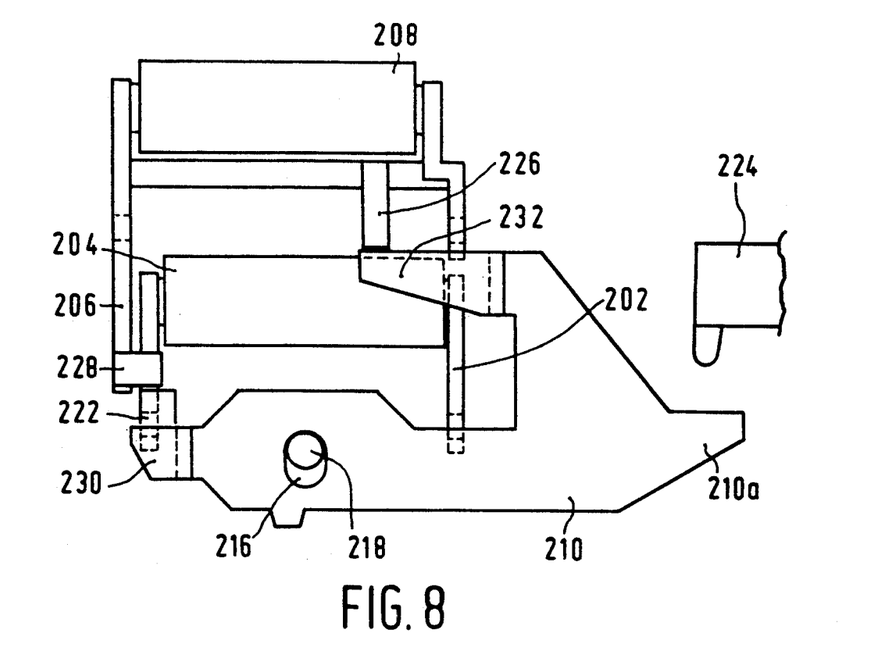
FIG. 8 is a plan view of the part shown in FIG. 7.

FIGS. 5 and 6 illustrate a situation in which the disc 16 is situated just between the rollers 88 and 204. From this situation, hereinafter referred to as the second mode, the disc 16 is introduced automatically, the disc reaching the follower roller 208 at a specific instant, which roller is tilted about the tilting axis 214 during passage of the disc, until the follower roller 208 follows the main surface 219 of the disc 16, as is shown in FIGS. 7 and 8. During the last-mentioned tilting movement the pivotal element 210 is pivoted about the first control projection as a result of the cooperation between the second control projection 226 and the follower limb 232 and thus assumes a third mode, in which the switch 224 is reset to its first switch position. In the third mode, in which the two tilting members 202 and 206 are in the operating position, the drive unit 97 is energized.

If the automatically inserted disc 16 has reached a certain position inside the housing of the disc player the command element 118 will be driven, as described hereinbefore. The command element 118 is so shaped and positioned relative to the actuating unit that an element portion 236 of the driven command element 118 comes into contact with the blocking element 228 to block the tilting members 202 and 206, in order to keep the follower rollers 204 and 208 clear of the main surface 219 of the information carrier during scanning. The blocking element 228 then bears against the control projection 212.

The command element 118 comprises an actuating projection 234, which actuates the detection switch 200 at the end of the automatic loading movement of the disc 16 in order to stop the drive unit 97.

Figure 9:
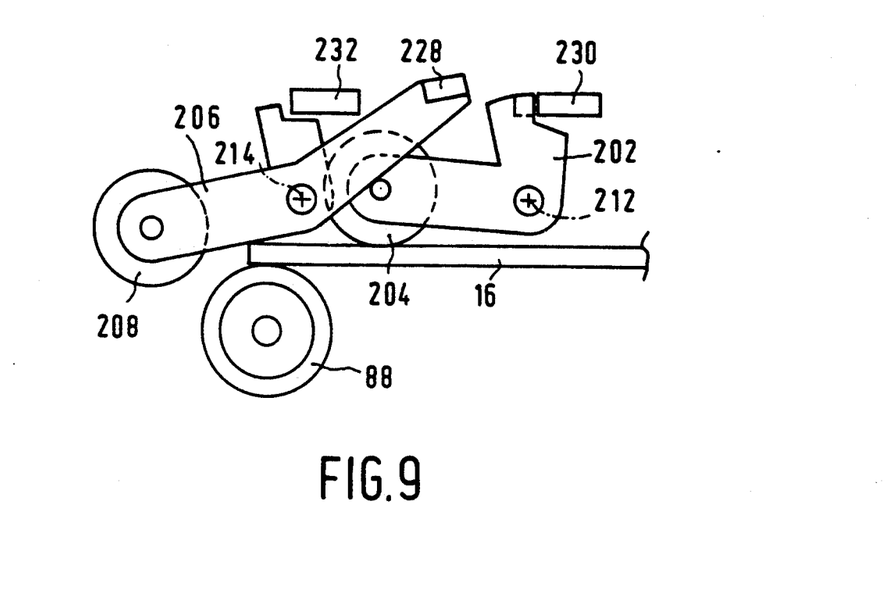
FIG. 9 is a side view of a part of the actuating unit in the second mode while the information carrier is moved out.
Figure 10:
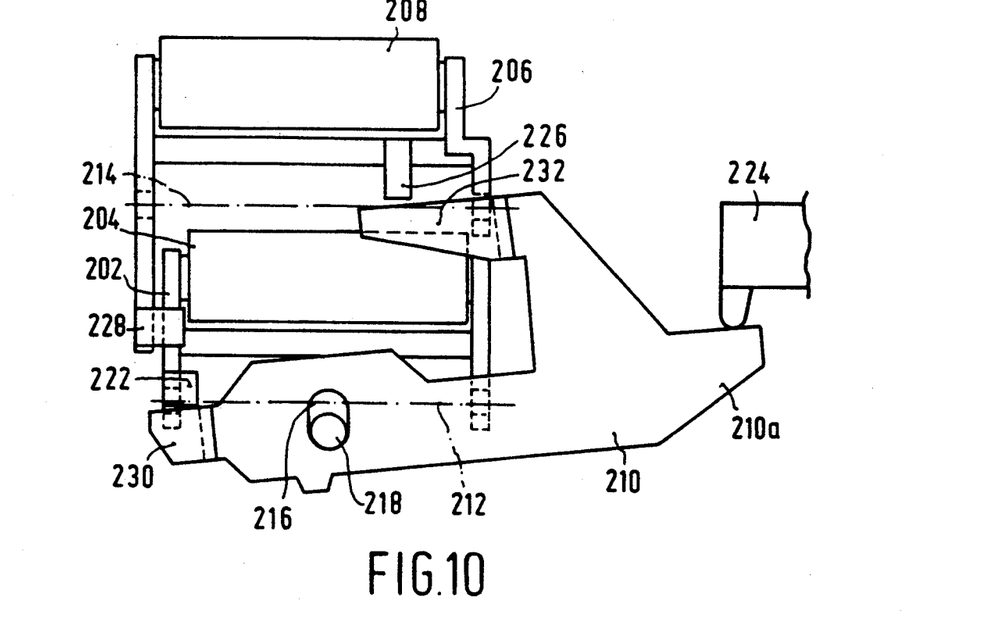
FIG. 10 is a plan view of the part shown in FIG. 9.

To eject the disc 16 the eject button 12 at the front of the disc player may be actuated. The energized drive unit 97 ensures that by a movement of the command element 118 in the direction A2 the blocking element 228 is released and the disc 16 is moved out by the loading system, in particular the drive roller 88. The circumferential edge of the disc which moves in the direction A2 then passes the second follower roller 208, which roller leaves the main surface 219 while at the same time the second tilting member 206 is tilted in an anti-clockwise direction. The spring 220 subsequently causes the pivotal element 210 to be pivoted about the control projection 212, upon which the switch 224 is set from the first to the second switch position and the driving unit 97 is stopped. The situation now attained, which corresponds to said second mode, is illustrated in FIGS. 9 and 10. In this mode the first tilting member 202 occupies the operating position and the second tilting member 206 occupies the starting position, so that the stationary disc 6 is clamped between the drive roller 88 and the follower roller 204. The pivotal element 210 is in the second position and keeps the switch 224 in its second switch position.

Figure 11:
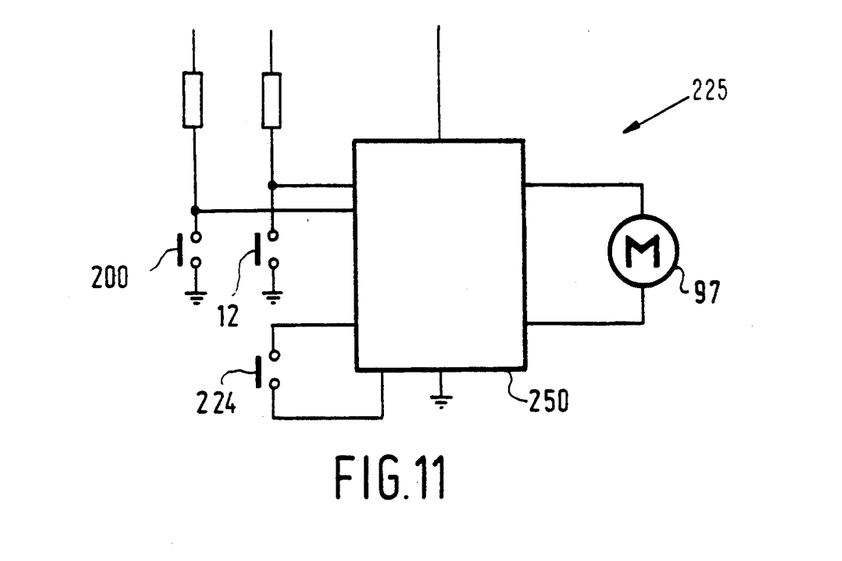
FIG. 11 shows diagrammatically an electrical circuit for energizing a drive unit of the loading system.

As shown in FIG. 11 the electrical circuit 225 comprises a microprocessor 250, which is programmed in such a way that if the third mode is followed by the second mode, as is illustrated in FIGS. 9 and 10, the stationary drive unit 97 is energized after a preset time for the re-insertion of the disc 16. During insertion of the disc the energizing current is oppositely directed to or is of a polarity opposite to the energizing current during ejection of the disc, in order to obtain the desired direction of rotation of the drive unit. If the disc 16 is removed from the slot 14 within the preset time the second mode will be changed to the first mode and the drive unit is no longer energized automatically.

It is to be noted that, obviously, the invention is not limited to the embodiment shown in the drawings. For example, disc players comprising another centering device than shown and disc players adapted to inscribe and/or read magneto-optical discs also fall within the scope of the invention.

We claim:

1. A disc player comprising a housing with an opening for insertion of a disc-shaped information carrier having at least one main surface; a frame; a turntable carried in said frame and rotatable about an axis of rotation; a scanning device including a unit for scanning an information carrier which has been loaded onto the turntable; and a loading system for automatically moving an information carrier, which has been inserted into the opening, along a loading path to the turntable, and for moving the information carrier along an unloading path from the turntable into said opening, the loading system comprising a drive unit; a drive element arranged to be driven by said drive unit to engage and move the information carrier; an electrical circuit including switching means for energizing the drive unit, said switching means being switchable between energized and non-energized conditions; and an actuating unit for actuating said switching means, and said actuating unit comprising a first tilting member including a follower element arranged to engage said main surface of the information carrier; said first tilting member being tiltable between at least one operating position, in which the follower element engages said main surface if an information carrier is present within said opening, and a starting position, characterized in that the actuating unit comprises a further tilting member including a further follower element arranged for cooperation with the main surface of the information carrier, a pivotal element arranged to switch said switching means between said energized and non-energized conditions, and means for controlling said pivotal element; said further tilting member being tiltable between at least one operating position, in which said further follower element engages said main surface if an information carrier is present within said opening, and a starting position, said means for controlling is responsive to positions of said first and further tilting members, in a first mode, in which both tilting members are in the starting position, said pivotal element being in a first position, and the electrical circuit for said drive unit being in said non-energized condition;

in a second mode, in which the first tilting member is in the operating position, and the further tilting member is in the starting position, said pivotal element being in a second position; and in a third mode, in which both tilting members are in the operating positions, said pivotal element being in a third position, and the electrical circuit for said drive unit being in an energized condition, and said electrical circuit comprises means for providing an energizing current for said drive unit after a change from the first to the second mode; and for at least temporarily interrupting said current after a change from the third to the second mode.

2. A disc player as claimed in claim 1, characterized in that the pivotal element is pivotable in a plane which is oriented transversely of the axis of rotation of the turntable.

3. A disc player as claimed in claim 2, in which the drive element comprises a drive roller for engaging with a main surface of the information carrier, characterized in that the pivotal element has a slot which extends at least substantially transversely of the drive roller and which is engaged by a fixed pin defining a first pivotal axis of the pivotal element, a resilient element secured to the frame biassing the pivotal element into the first position and exerting a return force to the first position on the pivotal element in the other positions.

4. A disc player as claimed in claim 3, characterized in that the first control projection in conjunction with the first stop portion defines a second pivotal axis of the pivotal element.

5. A disc player as claimed in claim 4, characterized in that the actuating unit comprises a blocking element which, in conjunction with a command element of the disc player, keeps the further follower element clear of the main surface of the information carrier, if present.

6. A disc player as claimed in claim 5, characterized in that the blocking element is arranged on the further tilting member.

7. A disc player as claimed in claim 5, characterized in that the blocking element in conjunction with the command element and the first tilting member keeps the first follower element clear of the main surface of the information carrier, if present.

8. A disc player as claimed in claim 3, characterized in that the drive roller is a circularly cylindrical member having a central portion of reduced diameter.

9. A disc player as claimed in claim 8, characterized in that the circularly cylindrical member has a rubber contact surface.

10. A disc player as claimed in claim 1, characterized in that the first tilting member comprises a first control projection for cooperation with a first stop portion of the pivotal element and the further tilting member comprises a further control projection for engaging with a second stop portion of the pivotal element.

11. A disc player as claimed in claim 10, in which the drive element comprises a drive roller for engaging with a main surface of the information carrier, characterized in that the pivotal element has a slot which extends at least substantially transversely of the drive roller and which is engaged by a fixed pin defining a first pivotal axis of the pivotal element, a resilient element secured to the frame biassing the pivotal element into the first position and exerting a return force to the first position on the pivotal element in the other positions.

12. A disc player as claimed in claim 11, characterized in that the drive roller is a circularly cylindrical member having a central portion of reduced diameter.

13. A disc player as claimed in claim 1, in which the switching means comprises a switch which is switchable to a first and a second position, characterized in that the switch is switchable by the pivotal element, the switch being in the first position in the first and the third mode and being in the second position in the second mode.

14. A disc player as claimed in claim 1, characterized in that said electrical circuit comprises a microprocessor having an output electrically connected to the switching means.

15. A disc player as claimed in claim 14, comprising an eject switch and a detection unit for detecting a predetermined position of the inserted information charier, characterized in that the microprocessor has outputs which are electrically connected to the eject switch and the detection unit.

16. A disc player as claimed in claim 14, characterized in that during operation and after a change from the third to the second mode the microprocessor keeps the energizing current interrupted for a specific time interval in the second mode and reverses the polarity of said current after expiry of said time interval.

17. A disc player as claimed in claim 1, in which the follower element is a circularly cylindrical body which is rotatable about an axis, characterized in that the further follower element is a rotatable circularly cylindrical body which extends parallel to the first-mentioned follower element.

18. A disc player as claimed in claim 1, in which the tilting member can be tilted about a first tilting axis oriented transversely of the loading and the unloading path, characterized in that the further tilting member can be tilted about a further tilting axis parallel to the first tilting axis.

19. A disc player as claimed in claim 1, characterized in that the actuating unit comprises a blocking element which, in conjunction with a command element of the disc player, keeps the further follower element clear of the main surface of the information carrier, if present.

20. An actuating unit for actuating a switching means in a loading system of a disc player comprising a housing with an opening for insertion of a disc-shaped information carrier having at least one main surface; a frame; a turntable carried in said frame and rotatable about an axis of rotation; and a scanning device including a unit for scanning an information carrier which has been loaded onto the turntable;

said loading system being a system for automatically moving an information carrier, which has been inserted into the opening, along a loading path to the turntable, and for moving the information carrier along an unloading path from the turntable into said opening, the loading system comprising a drive unit; a drive element arranged to be driven by said drive unit to engage and move the information carrier; an electrical circuit including said switching means for energizing the drive unit, said switching means being switchable between energized and non-energized conditions; and said actuating unit, and said actuating unit comprising a first tilting member including a follower element arranged to engage said main surface of the information carrier; said first tilting member being tiltable between at least one operating position, in which the follower element engages said main surface if an information carrier is present within said opening, and a starting position, characterized in that the actuating member comprises a further tilting member including a further follower element arranged for cooperation with the main surface of the information carrier, a pivotal element arranged to switch said switching means between said energized and non-energized conditions, and means for controlling said pivotal element; said further tilting member being tiltable between at least one operating position, in which said further follower element engages said main surface if an information carrier is present within said opening, and a starting position, said means for controlling is responsive to positions of said first and further tilting members, in a first mode, in which both tilting members are in the starting position, said pivotal element being in a first position, and the electrical circuit for said drive unit being in said non-energized condition;

in a second mode, in which the first tilting member is in the operating position, and the further tilting member is in the starting position, said pivotal element being in a second position; and in a third mode, in which both tilting members are in the operating positions, said pivotal element being in a third position, and the electrical circuit for said drive unit being in an energized condition, and said electrical circuit comprises means for providing an energizing current for said drive unit after a change from the first to the second mode; and for at least temporarily interrupting said current after a change from the third to the second mode.

* * * * *